United States Patent
Coffin et al.

[19]

[11] Patent Number: 6,104,693
[45] Date of Patent: Aug. 15, 2000

[54] MOUNTING SYSTEM FOR CARTRIDGE PLUNGE MECHANISM

[75] Inventors: Paul C. Coffin; Robert L. Mueller; Gregg S. Schmidtke, all of Fort Collins, Colo.

[73] Assignee: Hewlett-Packard Company, Palo Alto, Calif.

[21] Appl. No.: 09/045,380

[22] Filed: Mar. 20, 1998

[51] Int. Cl.[7] .......................... G11B 17/04; G11B 15/68
[52] U.S. Cl. ............................................... 369/178; 360/92
[58] Field of Search ................................... 369/34, 36, 38, 369/178, 179, 191, 192; 360/92, 98.04, 98.06

[56] References Cited

U.S. PATENT DOCUMENTS

| | | | |
|---|---|---|---|
| 4,998,232 | 3/1991 | Methlie et al. | 369/36 |
| 5,010,536 | 4/1991 | Wanger et al. | 369/36 |
| 5,014,255 | 5/1991 | Wanger et al. | 369/36 |
| 5,036,503 | 7/1991 | Tomita | 369/36 |
| 5,043,962 | 8/1991 | Wanger et al. | 369/36 |
| 5,101,387 | 3/1992 | Wanger et al. | 369/36 |
| 5,146,375 | 9/1992 | Satoh et al. | 360/92 |
| 5,277,540 | 1/1994 | Helms et al. | 414/751 |
| 5,508,859 | 4/1996 | Hu et al. | 360/92 |
| 5,515,356 | 5/1996 | Lee | 369/178 |
| 5,596,556 | 1/1997 | Luffel et al. | 369/36 |
| 5,638,349 | 6/1997 | Rugg et al. | 369/36 |
| 5,764,615 | 6/1998 | Ware et al. | 369/178 |
| 5,907,529 | 5/1999 | Permut | 369/178 |

FOREIGN PATENT DOCUMENTS

| | | |
|---|---|---|
| 0 500 385 A2 | 2/1992 | European Pat. Off. . |
| 59-213065 | 1/1984 | Japan . |
| 5-144146 | 6/1993 | Japan . |

*Primary Examiner*—David L. Ometz

[57] ABSTRACT

A cartridge engaging assembly has a frame assembly having a first side member and a second side member positioned in spaced-apart relation. A first horizontal guide surface is positioned on the first side member of the frame assembly and a second horizontal guide surface is positioned on the second side member of the frame assembly. A thumb assembly having first, second, and third bearing members is positioned on the first and second horizontal guide surfaces so that the first bearing member engages the first horizontal guide surface and so that the second and third bearing members engage the second horizontal guide surface.

11 Claims, 7 Drawing Sheets

MOUNTING SYSTEM FOR CARTRIDGE PLUNGE MECHANISM

FIELD OF INVENTION

This invention relates generally to data storage systems for handling and storing data cartridges, such as optical disk or magnetic tape cartridges, and more specifically to cartridge access devices for engaging and retrieving the data cartridges stored in data storage systems.

BACKGROUND

Many different types of data storage systems exist and are being used to store data cartridges at known locations and to retrieve desired data cartridges so that data may be written to or read from the data cartridges. Such data storage systems are often referred to as "juke box" data storage systems, particulary if they can accommodate a large number of individual data cartridges.

A typical juke box data storage system may include one or more different types of cartridge receiving devices for holding the various data cartridges. For example, one type of cartridge receiving device may comprise a cartridge storage rack or "magazine" while another type of cartridge receiving device may comprise a cartridge read/write device. The cartridge storage racks or magazines serve to provide storage locations for the data cartridges and are commonly arranged so that they form one or more vertical stacks. The cartridge read/write device may be located adjacent the cartridge stack, although the cartridge read/write device may be positioned at any convenient location. The data storage system may also be provided with a cartridge access device for accessing the various data cartridges contained in the cartridge receiving devices and a positioning device for moving the cartridge access device among the cartridge receiving devices.

If a host computer system issues a request for data contained on a particular data cartridge, a control system associated with the data storage system actuates the positioning system to move the cartridge access device along the cartridge storage rack until the cartridge access device is positioned adjacent the desired data cartridge. The cartridge access device then removes the data cartridge from the cartridge storage rack and carries it to the cartridge read/write device. The cartridge access device inserts the selected data cartridge into the cartridge read/write device so that the host computer may thereafter read data from or write data to the data cartridge. After the read/write operation is complete, the cartridge access device may remove the data cartridge from the read/write device and return it to the appropriate location in the cartridge storage rack.

The cartridge access device typically used in such a data storage system may include a cartridge engaging assembly or "picker" which engages the selected data cartridge and withdraws it from the cartridge receiving device (e.g., either the cartridge storage rack or the cartridge read/write device, as the case may be). The picker may also insert the data cartridge into the cartridge receiving device.

A typical cartridge engaging device or "picker" may comprise a cartridge plunge mechanism or "thumb" assembly that is adapted to selectively engage and disengage the data cartridge. The thumb assembly is usually slidably mounted to the picker so that the thumb assembly can move toward and away from a cartridge access end of the picker. The picker may also include a thumb actuator system which moves the thumb assembly toward and away from the cartridge access end of the picker. For example, if it is desired to retrieve a data cartridge from a cartridge receiving device, the thumb actuator system moves the thumb assembly toward the cartridge access end of the picker so that the thumb assembly can engage or "grab" the data cartridge. The thumb actuator system may retract the thumb assembly and engaged data cartridge into the picker. If it is desired to load the data cartridge into the cartridge receiving device, then the thumb actuator moves the thumb assembly and data cartridge toward the cartridge access end of the picker, thus inserting the data cartridge into the cartridge receiving device.

A commonly used thumb actuator system utilizes a lead-screw drive system to move the thumb assembly toward and away from the cartridge access end of the picker. In such a system, the lead-screw may be mounted for rotation on the frame of the picker assembly and the thumb assembly may be mounted to the lead-screw via a suitable lead-screw nut. A motor drive assembly connected to the lead-screw is used to rotate the lead-screw which, in turn, causes the thumb assembly to move toward and away from the cartridge access end of the picker.

As mentioned above, the thumb assembly is typically slidably mounted to the picker frame. If a lead-screw type of thumb actuator system is used, then the lead-screw generally functions as the primary guide to control the linear motion of the thumb assembly. The thumb assembly may also be supported by a secondary guide, such as a rod or flat surface, to prevent the thumb assembly from rotating about the primary guide or lead-screw.

While such lead-screw actuator/guide systems are known and are currently being used, they are not without their problems. For example, the lead-screw used to move the thumb assembly and to serve as the primary guide may be quite expensive and is generally supported in the picker frame by one or more ball bearings. Besides involving several relatively expensive components, such lead-screw actuator/guide systems may also be difficult to assemble and align. The secondary guide member may also comprise a relatively expensive component (e.g., a precision-machined rod) and may also pose assembly and alignment problems if the mounting system is to hold the tolerances required to accurately position the thumb assembly.

Consequently, a need exists for a cartridge engaging assembly or picker that does not require a lead-screw actuator/guide system, which typically involves the use of relatively expensive components and may be difficult to assemble and/or align. Such lead-screw actuator/guide systems may also involve a high parts count, which tends to add to the overall cost of the thumb actuator system and may pose additional assembly and/or alignment problems.

SUMMARY OF THE INVENTION

A cartridge engaging assembly may comprise a frame assembly having a first side member and a second side member positioned in spaced-apart relation. A first horizontal guide surface is positioned on the first side member of the frame assembly and a second horizontal guide surface is positioned on the second side member of the frame assembly. A thumb assembly having first, second, and third bearing members is positioned on the first and second horizontal guide surfaces so that the first bearing member engages the first horizontal guide surface, and so that the second and third bearing members engage the second horizontal guide surface.

BRIEF DESCRIPTION OF THE DRAWING

Illustrative and presently preferred embodiments of the invention are shown in the accompanying drawing in which:

FIGS. 6(a–b) are simplified sectional views in elevation showing the thumb assembly in the retracted and extended positions;

DETAILED DESCRIPTION OF THE INVENTION

Figure 1:
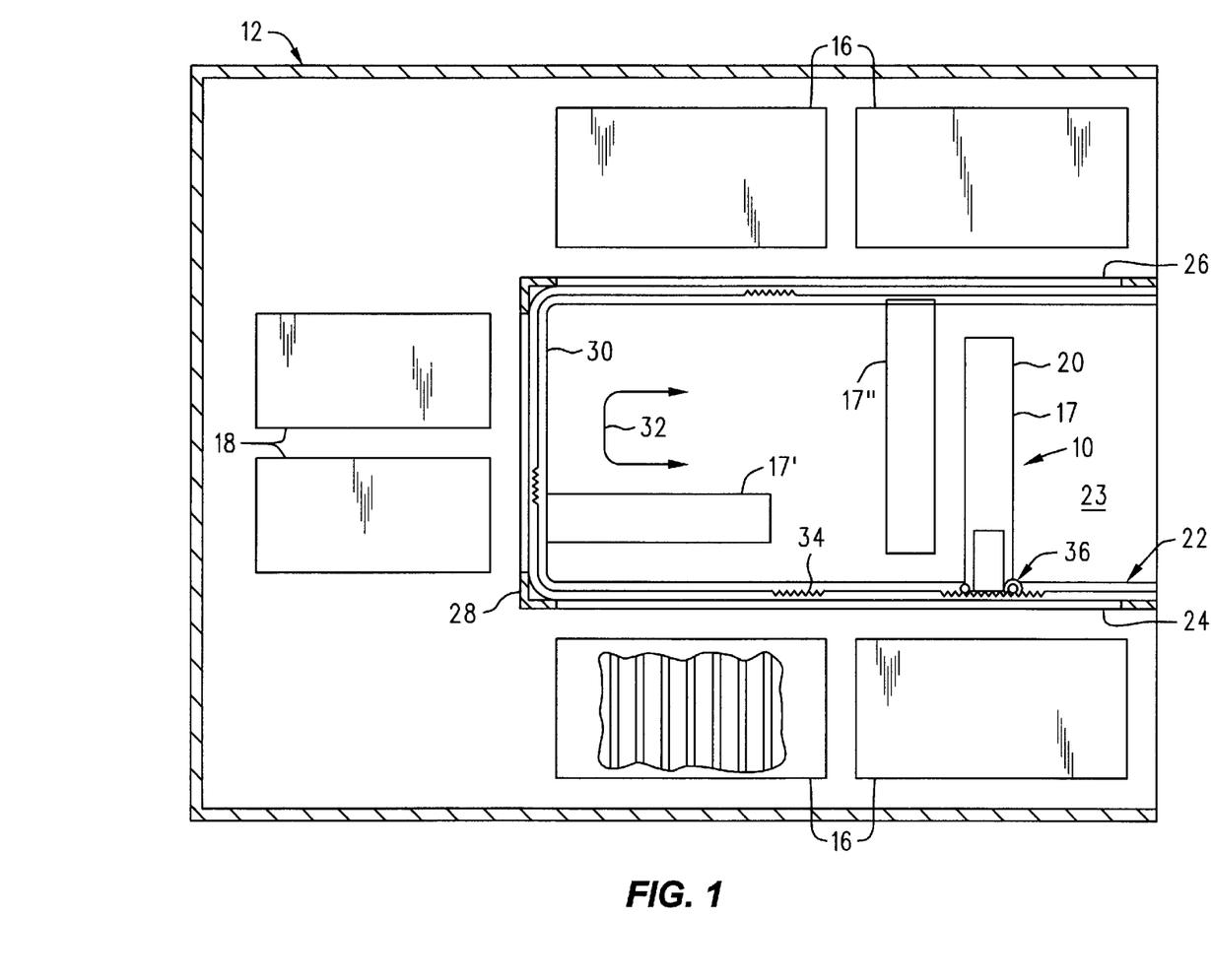
FIG. 1 is a plan view of a media access device and cartridge engaging assembly according to the present invention as it may be used in a data storage system to access and transport data cartridges contained within the data storage system.

A cartridge engaging assembly or "picker" 10 is shown in FIG. 1 as it could be used in a "juke box" data storage system 12 to transfer data cartridges 14 between one or more cartridge receiving devices, such as one or more cartridge storage racks or magazines 16 and one or more cartridge read/write devices 18. In one preferred embodiment, the various cartridge receiving devices (e.g., the cartridge storage racks or magazines 16 and the cartridge read/write devices 18) may be positioned at various locations within the data storage system 12 so that they define a generally U-shaped configuration, as best seen in FIG. 1. However, other configurations are possible. Alternatively, and as will be described in greater detail below, the cartridge engaging assembly or picker 10 according to the present invention may be used in any of a wide range of other types of data storage systems. For example, the cartridge engaging assembly 10 according to the present invention may also be utilized in a data storage system of the type shown and described in U.S. Pat. No. 5,596,556, entitled "Linear Displacement and Support Apparatus for use in a Cartridge Handling System," which is incorporated herein by reference for all that it discloses.

Regardless of the particular type or style of data storage system 12 in which the cartridge engaging assembly 10 is to be used, the cartridge engaging assembly or picker 10 according to the present invention may comprise a portion of a cartridge access device 20. The cartridge access device 20 may in turn comprise a portion of a cartridge positioning system 22 which moves the cartridge access device 20 along the various cartridge receiving devices (e.g., the cartridge storage racks or magazines 16 and the cartridge read/write devices 18) to access the data cartridges 14 contained therein.

The cartridge engaging assembly or picker 10 contained within the cartridge access device 20 is adapted to engage a data cartridge 14 contained in a cartridge receiving device and to draw the data cartridge 14 into the cartridge access device 20. The cartridge engaging assembly or picker 10 is also adapted to load or insert the data cartridge 14 into a cartridge receiving device, e.g., either the cartridge storage racks or magazines 16 or the cartridge read/write device 18, as the case may be. Stated simply, then, the cartridge engaging assembly 10 is used to retrieve data cartridges 14 from, and insert them into, the various cartridge receiving devices. The cartridge access device 20, which includes the cartridge engaging assembly 10, is used to transport the data cartridge 14 to a desired location within the data storage system 12.

Figure 2:
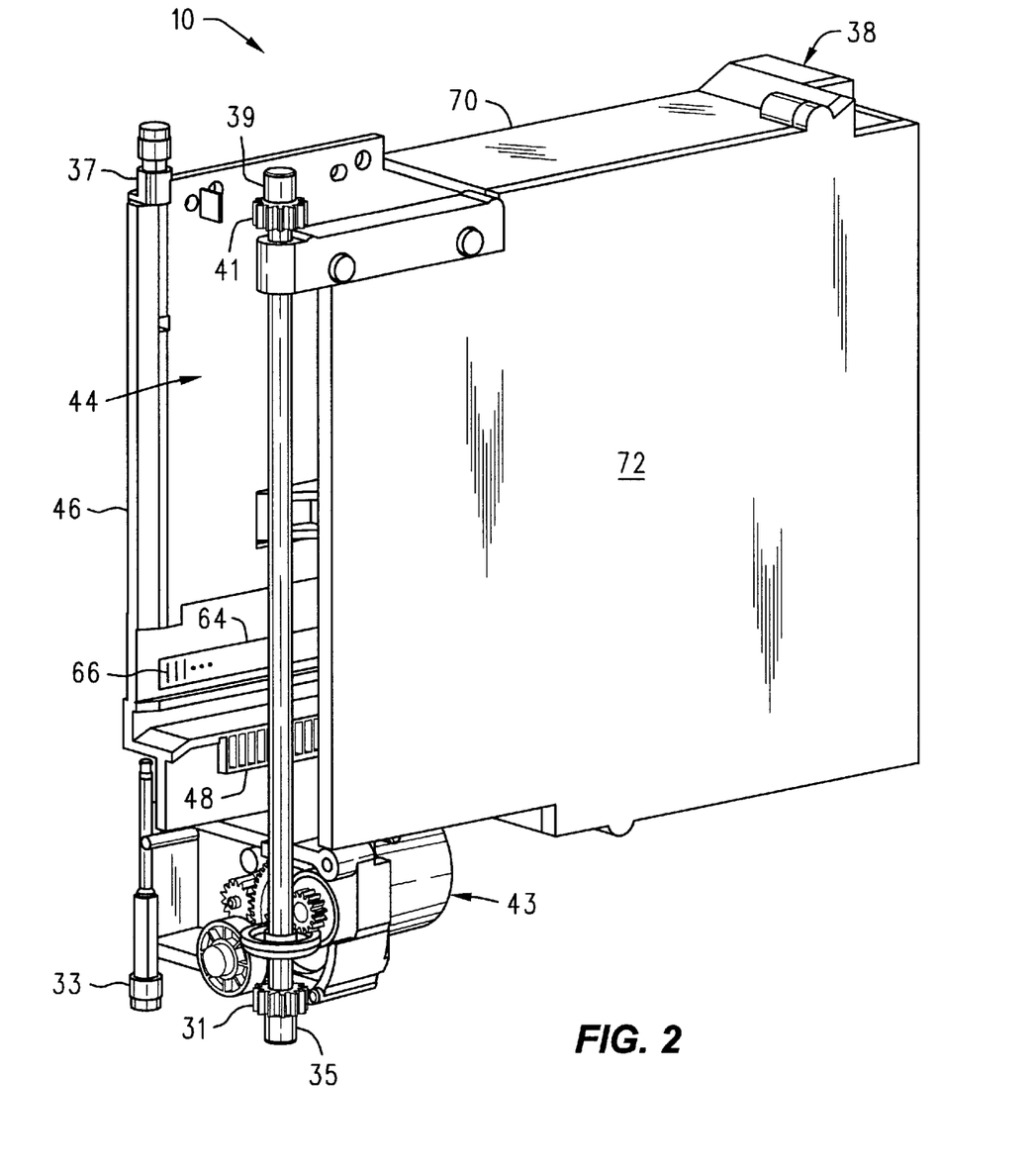
FIG. 2 is a perspective view of the media access device shown in FIG. 1.
Figure 3:
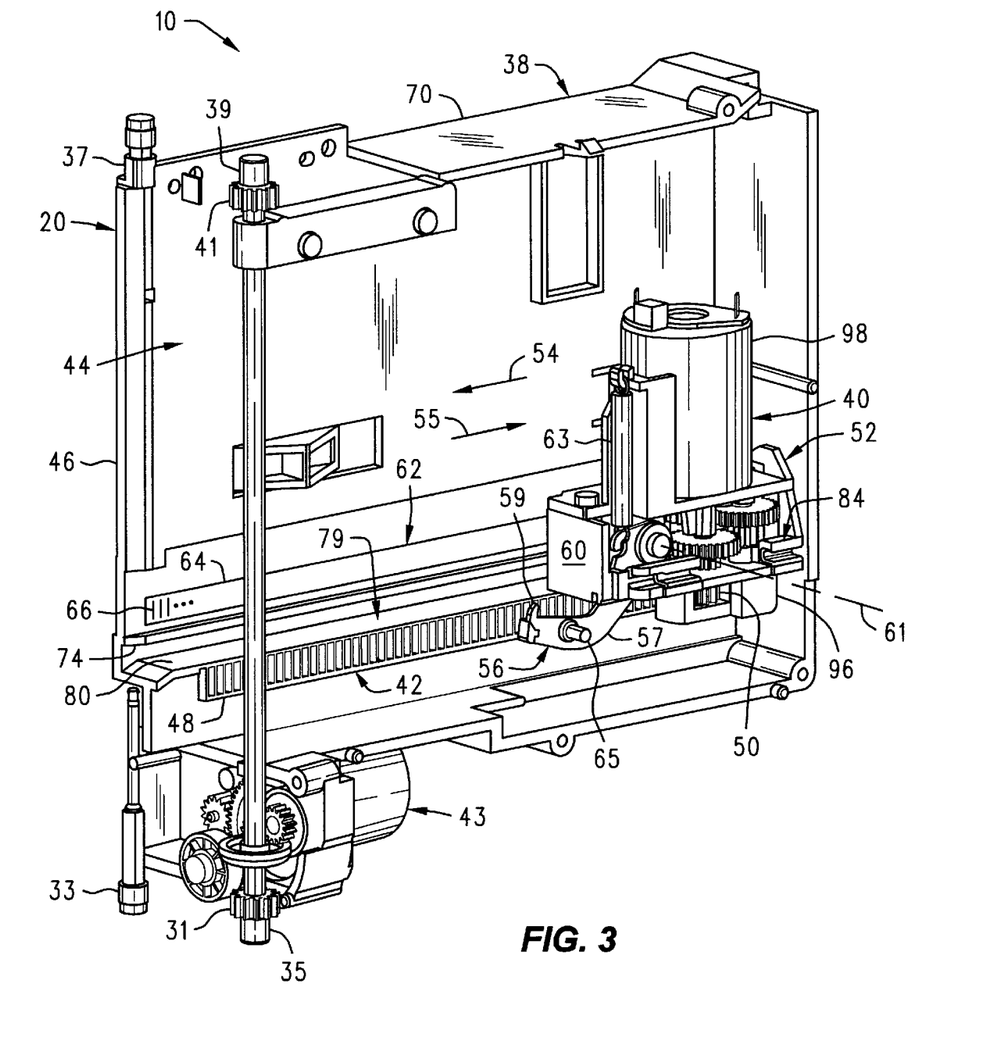
FIG. 3 is a perspective view of the media access device shown in FIG. 2, but with the second side member removed to show the arrangement of the rack and pinion thumb actuator system.
Figure 4:
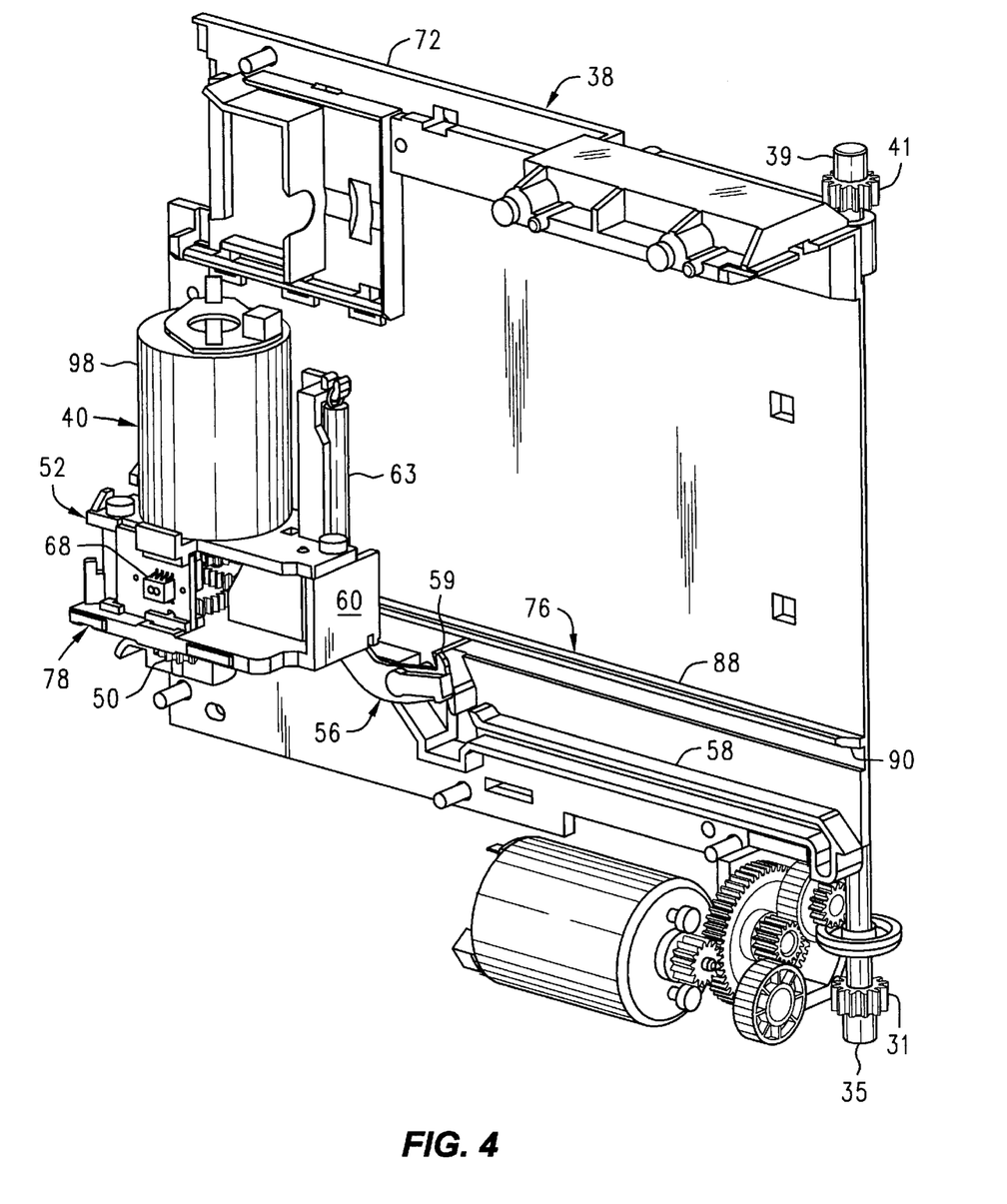
FIG. 4 is a perspective view of the media access device, but with the first side member removed to show the arrangement of the thumb and finger guide track.

Referring primarily to FIGS. 2–4, the cartridge engaging assembly 10 according to the present invention may include a frame assembly 38 that defines a chamber or cavity 44 sized to receive the data cartridge 14. A cartridge plunge mechanism or "thumb" assembly 40 is slidably mounted to the frame assembly 38 so that the thumb assembly 40 may be moved toward and away from the cartridge access end 46 of frame assembly 38, generally in the directions indicated by arrows 54 and 55, respectively. See FIG. 3. More specifically, the thumb assembly 40 may be moved between a fully retracted position (shown in FIGS. 3, 4, and 6(a)) and a fully extended position (shown in FIG. 6(b)).

In one preferred embodiment, the mounting system used to slidably mount the thumb assembly 40 to the frame assembly 38 may include a first guide rail 79 positioned on the first side member 70 of frame assembly 38 and a second guide rail 76 positioned on the second side member 72. See FIGS. 3 and 4. The first guide rail 79 includes a first horizontal surface 80 and the second guide rail 76 includes a second horizontal surface 88. The thumb assembly 40 includes a first flange member 78 for slidably engaging the first horizontal surface 80 of the first guide rail 79 and a second, C-shaped flange member 84 for slidably engaging the second horizontal surface 88 of second guide rail 76. The mounting system guides the thumb assembly 40 along a horizontal plane and allows it to be moved toward and away from the cartridge access end 46 of frame assembly 38, generally in the directions of arrows 54 and 55, respectively. See FIG. 3.

Figure 6A:
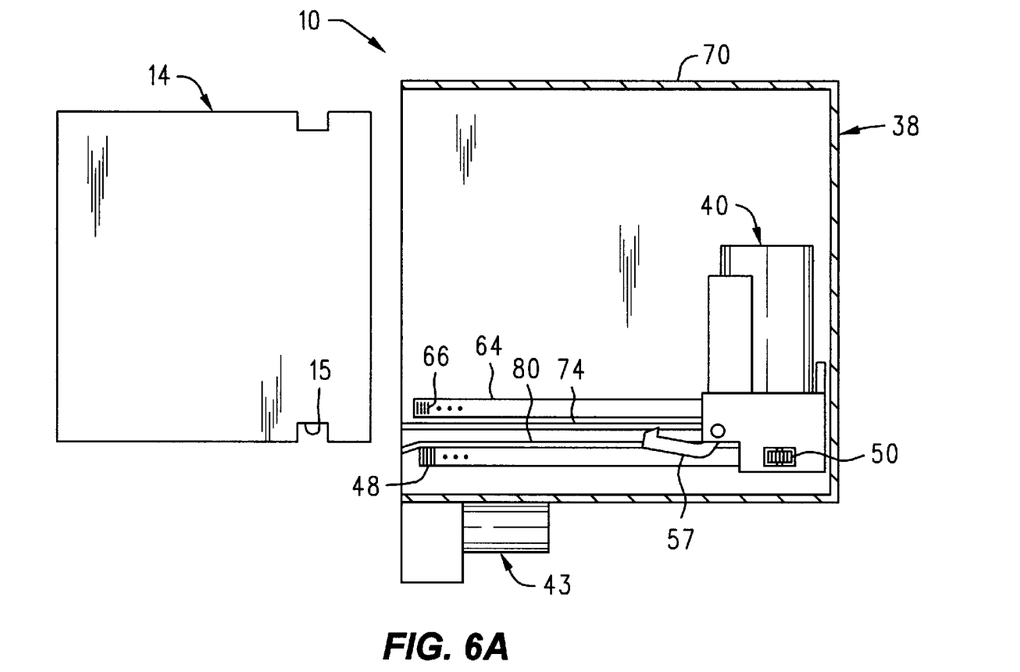
Figure 6B:
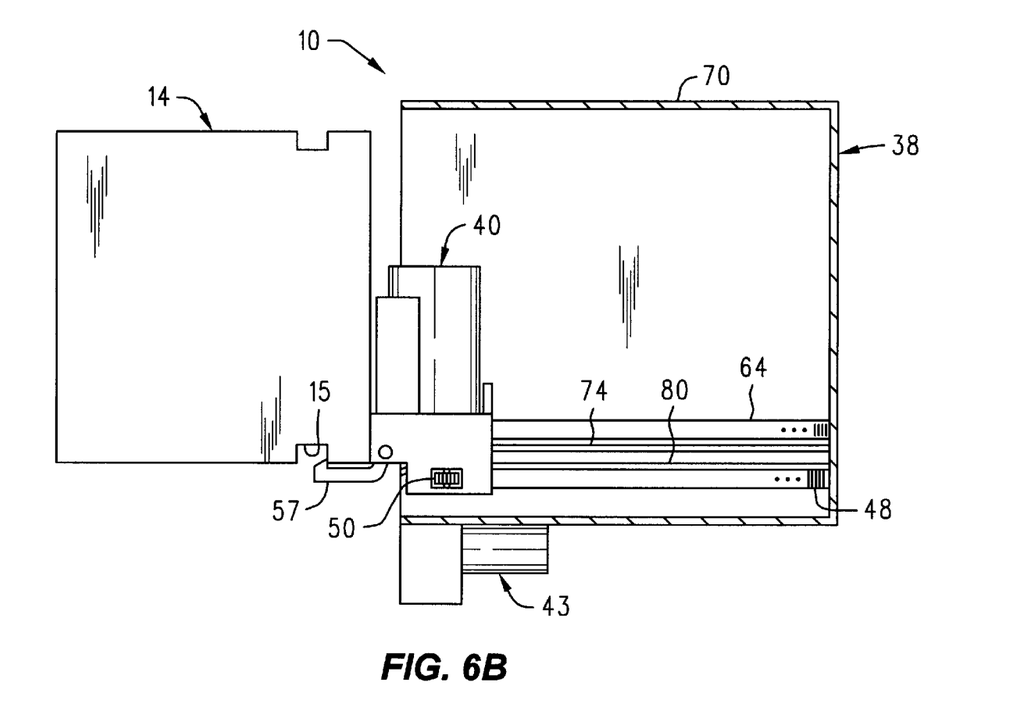

A rack and pinion drive assembly 42 is used to move the thumb assembly 40 back and forth between the retracted position and the extended position. Essentially, the rack and pinion drive assembly 42 may comprise a gear rack 48 mounted to the first side member 70 of frame assembly 38 and a pinion gear 50 mounted to the thumb assembly 40. The pinion gear 50 is mounted to the thumb assembly 40 so that pinion gear 50 engages the gear rack 48, as best seen in FIGS. 3 and 6(a–b). A drive system 52 connected to the pinion gear 50 rotates the pinion gear 50 to move the thumb assembly 40 toward and away from the cartridge access end 46 of the frame assembly 38, i.e., generally in the directions indicated by arrows 54 and 55, respectively.

Figure 7:
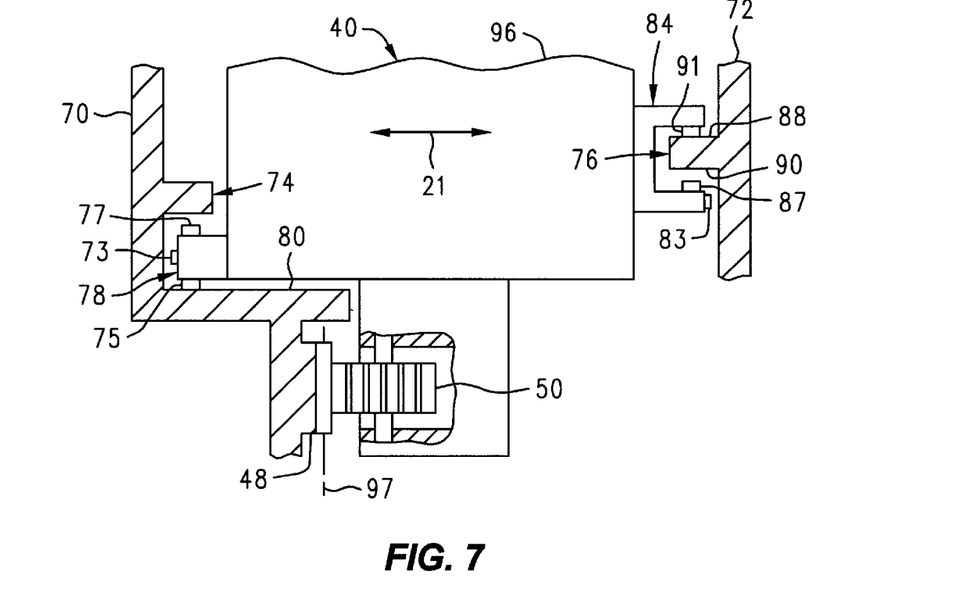
FIG. 7 is an enlarged cross-section view in elevation of the thumb and guide rail assembly more clearly showing the engagement of the bearing members of the first and second flange members with the various guide rails.

The engagement of the pinion gear 50 with the gear rack 48 defines a vertical guide surface or plane 97, as best seen in FIG. 7. This vertical guide surface or plane 97, together with second or C-shaped flange member 84 on thumb assembly 40 and the second side member 72 limits the side-to-side movement (indicated by arrows 21) of the thumb assembly 40.

The thumb assembly 40 may also be provided with a finger assembly 56 configured to engage a notch 15 or other similar feature provided on the data cartridge 14, as best seen in FIG. 6b. The finger assembly 56 allows the thumb assembly 40 to engage and withdraw the data cartridge 14 from the cartridge receiving device. In one preferred embodiment, the finger assembly 56 is actuated by a guide track 58 in the frame assembly 38, as best seen in FIG. 4.

The cartridge engaging assembly 10 may also be provided with an encoder system 62 to provide an output signal from which information may be derived about the position of the thumb assembly 40 in the frame assembly 38. In one preferred embodiment, the encoder system 62 may include an elongate linear reference member 64 having a plurality of index marks 66 thereon. A detector assembly 68 mounted to the thumb assembly 40 detects the index marks 66 on the elongate linear reference member 64 and produces an output signal indicative of the presence or absence of an index mark. The picker control system (not shown) connected to the detector assembly 68 may derive information relating to the position, velocity, and acceleration of the thumb assembly 40 based on the output signal produced by the detector assembly 68. The picker control system (not shown) may use such information to control the operation of the drive system 52, thus the movement of the thumb assembly 40.

The cartridge engaging assembly 10 may be operated as follows to retrieve a data cartridge 14 from the selected cartridge receiving device (e.g., either the cartridge storage rack 14 or the cartridge read/write device 18, as the case may be). Assuming that the cartridge positioning system 22 (FIG. 1) has positioned the cartridge access device 20 adjacent the selected data cartridge 14, the picker control system (not shown) may actuate the drive system 52 to rotate the pinion gear 50 so as to move the thumb assembly 40 toward the cartridge access end 46 of the frame assembly 38. That is, the drive system 52 moves the thumb assembly 40 in the direction of arrow 54. As the thumb assembly 40 approaches the data cartridge 14, the finger assembly 56 engages the notch 15 or other similar feature on the data cartridge 14. See FIG. 6(b). The arrangement of the thumb and finger assemblies 40 and 56 is such that the finger assembly 56 engages the notch 15 on data cartridge 14 when the thumb assembly 40 is at or near the fully extended position. This condition is illustrated in FIG. 6b. After the data cartridge 14 has been engaged by the finger assembly 56, the picker control system (not shown) may operate the drive system 52 to reverse the direction of rotation of the pinion gear 50. This causes the thumb assembly 40, along with the engaged cartridge 14, to move in the opposite direction (i.e., in the direction of arrow 55 (FIG. 3)), thereby retracting the thumb assembly 40 and data cartridge 14 into the cavity 44 defined by the frame assembly 38. The drive system 52 continues to retract the thumb assembly 40 and engaged data cartridge 14 until the data cartridge 14 is drawn into the cavity 44 of frame assembly 38 by an amount sufficient to allow the positioning system 22 (FIG. 1) to move the cartridge access device 20 to another location. The positioning system 22 may thereafter move the cartridge access device 20 to a new location.

Once the cartridge access device 20 has been properly positioned adjacent the new location, the picker control system (not shown) may again actuate the drive system 52 to move (i.e., extend) the thumb assembly 40 in the direction of arrow 54. As the thumb assembly 40 moves toward the cartridge access end 46 of the frame assembly 38, the thumb portion 60 pushes against the data cartridge 14, thereby pushing the data cartridge 14 into the selected cartridge receiving device (e.g., the cartridge storage rack or magazine 16 or the cartridge read/write device 18, as the case may be) At the same time, the guide track 58 actuates the finger assembly 56 to disengage the finger assembly 56 from the notch 15 provided in the data cartridge 14. Once the thumb assembly 40 is fully extended, the data cartridge 14 will have been inserted fully into the cartridge receiving device. The picker control system (not shown) may then actuate the drive system 52 to retract the thumb assembly 40 back into the cartridge engaging assembly 10. The cartridge access device 20 is then ready to withdraw another data cartridge 14 and transport it to a new location.

A significant advantage of the cartridge engaging assembly or picker 10 according to the present invention is that it does not require a lead-screw actuator/guide system to extend and retract the thumb assembly, with all the associated disadvantages. The various horizontal guide surfaces 80 and 88 may be provided as integral components of the first and second side members 70 and 72 of the frame assembly 38, thereby eliminating the need to separately align the guide members and generally allowing tighter positioning tolerances to be more easily obtained. The mounting system also reduces the overall parts count of the system, thereby simplifying assembly and reducing costs.

Having briefly described the cartridge engaging assembly 10 according to the present invention, as well as some of its more significant features and advantages, the cartridge engaging assembly will now be described in detail. However, before proceeding with the description, it should be noted that the cartridge engaging assembly 10 according to the present invention may be utilized in any of a wide range of data storage systems now known in the art or that may be developed in the future for storing and accessing one or more data cartridges. Accordingly, the present invention should not be regarded as limited to the particular data storage system 12 shown and described herein. It should also be noted that while the cartridge engaging assembly 10 is shown and described herein as it could be used to store and retrieve a DLT (digital linear tape) data cartridge 14 having a standard size and configuration, it is not limited to any particular type or style of data cartridge. Indeed, the cartridge engaging assembly 10 according to the present invention could be used with any type of data storage device comprising any type of data storage medium (e.g., magnetic disk or tape, optical disk, etc.). Consequently, the present invention should not be regarded as limited to use with the DLT type of data cartridge 14 shown and described herein.

With the foregoing considerations in mind, one embodiment of a cartridge engaging assembly or picker 10 is shown in FIG. 1 as it may be used in a data storage or "juke box" system 12 to transfer data cartridges 14 between one or more cartridge receiving devices, such as one or more cartridge storage racks or magazines 16 and one or more cartridge read/write devices 18. The various cartridge receiving devices (e.g., the cartridge storage racks or magazines 16 and the cartridge read/write devices 18) may be positioned at various locations within the data storage system 12 so that they define a generally U-shaped configuration, as best seen in FIG. 1, although other arrangements are possible. By way of example, the data storage system 12 may comprise a data storage system of the type shown and described in U.S. patent application Ser. No. 09/045,134, entitled "Multi-Plane Translating Cartridge Handling System" (Attorney Docket No. 10971539-1) filed concurrently herewith and which is incorporated herein by reference for all that it discloses. Alternatively, the cartridge engaging assembly 10 may be utilized in a data storage system of the type shown and described in U.S. Pat. No. 5,596,556 referred to above and which is also incorporated herein by reference for all that it discloses.

Regardless of the particular type or style of data storage system 12 in which the cartridge engaging assembly 10 is used, the cartridge engaging assembly or picker 10 according to the present invention may comprise a portion of a cartridge access device 20. The cartridge access device 20 may in turn comprise a portion of a positioning system 22 which moves the cartridge access device 20 along the various cartridge receiving devices (e.g., the cartridge storage racks or magazines 16 and the cartridge read/write devices 18) to access the data cartridges 14 contained therein.

By way of example, the cartridge positioning system 22 utilized in one preferred embodiment may be of the type shown and described in U.S. patent application Ser. No. 09/045,134 (Attorney Docket No. 10971539-1) identified above. The cartridge positioning system 22 disclosed in that patent application may comprise a generally rectangularly shaped structure having a pair of opposed side portions 24 and 26 and an end portion 28. A pair of cartridge storage racks or magazines 16 may be positioned adjacent the two opposed sides 24 and 26 of the cartridge positioning system 22. Similarly, a pair of cartridge read/write devices 18 may be positioned adjacent the end 28 of the cartridge positioning system 22.

The cartridge positioning system 22 may also include a lower plate 23 having U-shaped guide member or channel 30 therein which guides the cartridge access device 20 along a generally U-shaped path 32 so that the cartridge access device 20 may access the data cartridges 14 contained in the various cartridge storage racks or magazines 16 and the cartridge read/write devices 18. The cartridge access device 20 may be moved along the U-shaped guide member or channel 30 by an actuator system 36. For example, the actuator system 36 may move the cartridge access device 20 between a first position 17 adjacent the first side portion 24 of the positioning system 22, a second position 17' adjacent the end portion 28, and a third position 17" adjacent the second side portion 26, i.e., along the generally U-shaped path 32.

The actuator system 36 may comprise a rack and pinion drive system having a U-shaped gear rack 34 mounted adjacent the U-shaped guide member or channel 30 in the lower plate 23. A lower pinion gear 31 may be mounted to the cartridge access device 20 so that it engages the U-shaped gear rack 34. A pair of lower bearing members 33, 35 mounted to the cartridge access device 20 are configured to be received by the U-shaped guide member or slot 30. The cartridge access device 20 may also be provided with a pair of upper bearing members 37, 39 and an upper pinion gear 41 which engage an upper U-shaped guide member (not shown) and an upper U-shaped gear rack (not shown) provided on an upper plate (not shown) associated with the cartridge positioning system 22. A drive pinion actuator system 43 is used to drive the lower and upper pinion gears 31 and 41 and move the cartridge access device 20 along the U-shaped path 32.

The foregoing description of the data storage system 12 and cartridge positioning system 22 is provided in order to better understand one environment in which the cartridge engaging assembly 10 according to the present invention may be used. However, it should be understood that the cartridge engaging assembly 10 may be used in any of a wide range of other types of data storage systems and in conjunction with any of a wide range of cartridge positioning systems now known or that may be developed in the future. Consequently, the present invention should not be regarded as limited to the particular data storage system 12 and cartridge positioning systems 22 shown and described herein. Also, since detailed descriptions of the data storage system 12 and cartridge positioning system 22 are not required to understand or practice the cartridge engaging assembly 10 according to the present invention, the particular data storage system 12 and cartridge positioning system 22 that may be used in conjunction with the cartridge engaging assembly 10 will not be described in further detail herein.

Figure 5:
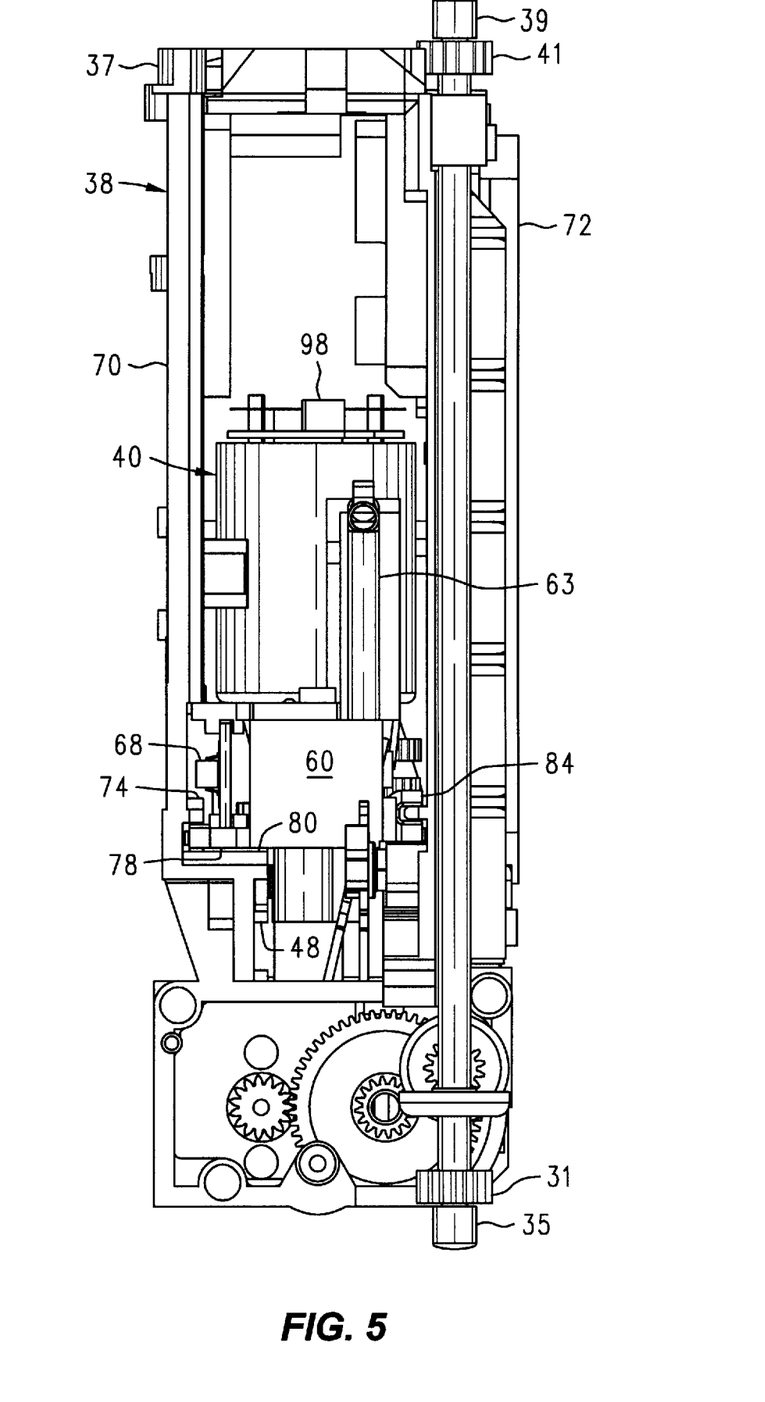
FIG. 5 is an end view in elevation showing the engagement of the thumb and guide rail assemblies.

The details of the cartridge engaging assembly 10 according to one preferred embodiment of the present invention are best seen in FIGS. 3–5. Essentially, the cartridge engaging assembly 10 may include a frame assembly 38 having a first side member 70 and a second side member 72. The two side members 70 and 72 of frame assembly 38 define a chamber or cavity 44 of sufficient size to receive the data cartridge 14. The thumb assembly 40 is slidably mounted to the frame assembly 38 so that the thumb assembly 40 may be moved toward and away from the cartridge access end 46 of frame assembly 38, generally in the directions of arrows 54 and 55, respectively. See FIG. 3. More specifically, the thumb assembly 40 is slidably mounted to the frame assembly 38 so that the thumb assembly can be moved between a retracted position (shown in FIGS. 3, 4, and 6(a)) and an extended position (shown in FIG. 6(b)).

In one preferred embodiment, the thumb assembly 40 may be mounted on first and second elongate guide rails 79 and 76 that are provided on the first and second sides 70 and 72, respectively, of frame assembly 38. The first elongate guide rail 79 includes a first horizontal guide surface 80, whereas the second elongate guide rail 76 includes a second horizontal guide surface 88. In one preferred embodiment, the first and second horizontal guide surfaces 80 and 88 are non-coplanar, as best seen in FIG. 7. Alternatively, the first and second horizontal guide surfaces 80 and 88 may be coplanar. In any event, the main body portion 96 of thumb assembly 40 may include a first flange member 78 sized and positioned to engage the first horizontal guide surface 80 of first elongate guide rail 79. The main body portion 96 of thumb assembly 40 may also include a second or C-shaped flange member 84 adapted to engage the second horizontal guide surface 88 of the second elongate guide rail 76.

Figure 8:
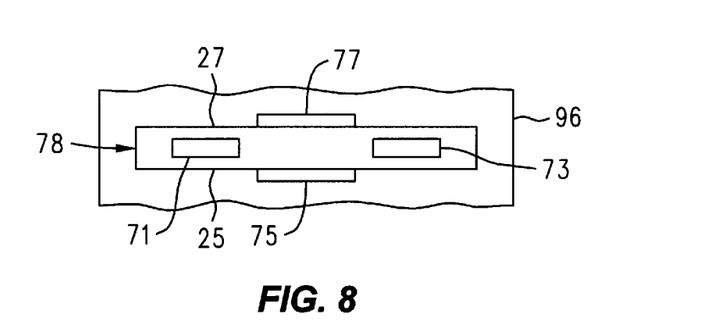
FIG. 8 is an enlarged side view of the first flange member of the thumb assembly.

Referring now primarily to FIGS. 7 and 8, the first flange member 78 may comprise a generally rectangularly shaped member having a bottom surface 25 and a top surface 27. A first or lower bearing member 75 is provided on the bottom surface 25 of first flange member 78 and contacts the first horizontal guide surface 80, as best seen in FIG. 7. The top surface 27 of flange member 78 may also be provided with an upper bearing member 77. The upper bearing member 77 is positioned so that it may contact a horizontal capture rail 74. The first flange member 78 may also be provided with a pair of vertical bearing members 71 and 73 positioned so that they may contact the first side member 70. However, as will be explained in greater detail below, the upper bearing member 77 and pair of vertical bearing members 71 and 73 do not normally contact their respective adjacent surfaces.

Figure 9:
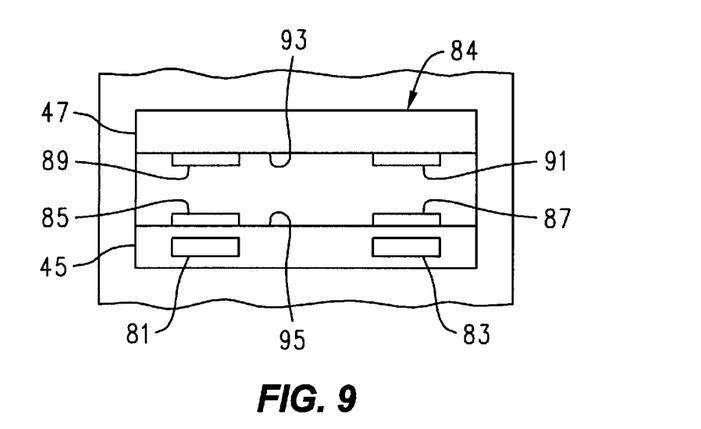
FIG. 9 is an enlarged side view of the second, C-shaped flange member of the thumb assembly.

The second flange member 84 may comprise a substantially C-shaped member and is best seen in FIGS. 7 and 9. Essentially, the second flange member 84 comprises a lower horizontal member 45 and an upper horizontal member 47. The bottom facing surface 93 of upper horizontal member 47 may be provided with a pair of bearing members 89 and 91 positioned in spaced-apart relation. The pair of bearing members 89 and 91 contact the second horizontal surface 88 on the second guide rail 76, as best seen in FIG. 7. Additionally, the lower horizontal member 45 may be provided with a plurality of bearing members. More specifically, the lower horizontal member 45 may be provided with a pair of vertical bearing members 81 and 83 positioned so that they may contact the second side member 72. The upper facing surface 95 of lower horizontal member 45 may be provided with a pair of bearing members 85 and 87 positioned so that they may contact the bottom surface 90 of the second guide rail 76. The various bearing members 81, 83, 85, and 87 provided on the lower horizontal member 45 do not normally contact their respective adjacent surfaces.

In accordance with the structural arrangement described above, the thumb assembly 40 is supported on one side by the bearing member 75 that contacts the first horizontal surface 80, and on the other side by the bearing members 89 and 91 that contact the second horizontal surface 88. The three bearing members 75, 89, and 91 allow the thumb assembly 40 to be moved along a defined horizontal plane (not shown), even though the bearing members 75, 89, and 91 themselves may be non-coplanar.

The side-to-side movement of the thumb assembly 40 (e.g., movement in the directions indicated by arrows 21 (FIG. 7)) is limited by a combination of the engagement of the pinion gear 50 and gear rack 48 on the one side, and on the other side by the pair of vertical bearing members 81 and 83 and the second side member 72. More specifically, the engagement of the pinion gear 50 and the gear rack 48 defines a vertical guide surface or plane 97 which limits the maximum leftward (looking at FIG. 7) movement of the thumb assembly 40. The maximum rightward movement of the thumb assembly 40 is limited by the pair of vertical bearing members 81 and 83 contacting the second side member 72, the second side member 72 defining a second vertical guide surface or plane. As will be described in greater detail below, it is generally preferred that spaces or gaps be provided between the pair of vertical bearing members 81 and 83 and the side member 72 to prevent binding of the pinion gear 50 and gear rack 48. See FIG. 7.

Recognizing that pinion gear 50 and gear rack 48 will wear with use, the first flange member 78 may be provided with the pair of vertical bearing members 71 and 73 which may eventually contact the first side member 70. The pair of vertical bearing members 71 and 73 thereby limit the maximum leftward movement of the thumb assembly 40 even if the pinion gear 50 and gear rack 48 experience excessive wear. Put another way, the maximum side-to-side movement (arrows 21) of the thumb assembly 40 generally will not exceed the sum of the spaces or gaps provided between the pair of vertical bearing members 71 and 73 and the first side member 71 on the one side of thumb assembly 40, and the pair of vertical bearing members 81 and 83 and the second side member 72 on the other side of thumb assembly 40.

The various spaces or gaps provided between the first pair of vertical bearing members 71 and 73 and the first side member 71 and provided between the second pair of vertical bearing members 81 and 83 and the second side member 72 may comprise any of a wide range of sizes depending on the amount of horizontal positioning accuracy that is to be provided for the thumb assembly 40. By way of example, in one preferred embodiment, the spaces or gaps provided between the vertical bearing members 71 and 73 and the first side member 70 may be in the range of about 0.10 mm to 0.60 mm (0.35 mm preferred). Similarly, the spaces or gaps provided between the second pair of vertical bearing members 81 and 83 and the second side member 72 may be in the range of about 0.01 mm to 0.61 mm (0.3 mm preferred).

In one preferred embodiment, the first side member 70 may also be provided with the capture rail 74 to prevent excessive upward vertical movement of the first flange member 78. Excessive upward vertical movement of the second or C-shaped flange member 84 is provided by the lower surface 90 of second guide rail 76. The bearing member 77 on the first flange member 78 and the bearing members 85 and 87 on the lower horizontal member 45 of the second flange member 84 will contact the capture rail 74 and lower surface 90 of second guide rail 76, respectively, should the condition develop wherein the thumb assembly 40 is urged upward.

It is generally preferred that spaces or gaps be provided between the bearing member 77 and the capture rail 74 on the one side of thumb assembly 40, and the bearing members 85 and 87 and the lower surface 90 of the second guide rail 76 on the other side of thumb assembly 40. The various spaces or gaps may comprise any of a wide range of sizes depending on the amount of vertical positioning accuracy that is to be provided for the thumb assembly 40. By way of example, in one preferred embodiment, the spaces or gaps provided between the bearing members 77 and the capture rail 74 may be in the range of about 0.05 mm to 0.45 mm (0.25 mm preferred). Similarly, the spaces or gaps provided between the bearing members 85 and 87 and the lower surface 90 of the second guide rail 76 may be in the range of about 0.05 mm to 0.45 mm (0.25 mm preferred).

The various components of the mounting system just described may be made from any of a wide range of materials suitable for the intended application. For example, in one preferred embodiment, the first and second side members 70 and 72 comprising the frame assembly 38 are molded from polycarbonate plastic, although other materials may also be used. It is preferred, but not required, that the various guide rails (e.g., the first and second guide rails 79 and 76, as well as the capture rail 74) associated with the first and second side members 70 and 72 be provided as integral components thereof, thus eliminating the need to separately attach and align these components to the two side members 70, 72. For example, in one preferred embodiment wherein both side members 70 and 72 are molded from polycarbonate plastic, the first guide rail 79, second guide rail 76, and capture rail 74 are molded into the first and second side members 70 and 72, as best seen in FIGS. 3 and 4.

The main body portion 96 of thumb assembly 40 may also be made from any of a wide range of materials, such as metals or plastics, suitable for the intended application. For example, in one preferred embodiment, the main body portion 96 of thumb assembly 40 is molded from nylon, although other materials could also be used. The various bearing members 71, 73, 75, etc., provided on the first and second flange members 78 and 84 of the main body 96 of thumb assembly 40 may comprise integral portions of the respective flange members 78 and 84. Alternatively, the various bearing members 71, 73, 75, etc., may be provided as separate components that are then fixedly attached to the first and second flange members 78 and 84 at the appropriate positions. If so, the various bearing members 71, 73, 75, etc., may be fabricated from any of a wide range of materials (such as Teflon®) suitable for providing a low friction engagement with the various surfaces of the various guide rails.

As mentioned above, the thumb assembly 40 is moved between the retracted and extended positions by a rack and pinion drive assembly 42, as best seen in FIG. 3. Essentially, the rack and pinion drive assembly 42 comprises an elongate gear rack 48 that is affixed to the first side member 70 of frame assembly 38 at any convenient position. For example, in one preferred embodiment, the gear rack 48 is affixed to the first side member 70 at a position immediately below the horizontal guide surface 80. Alternatively, the gear rack 48 may be affixed elsewhere on the first side member 70 or could even be affixed to the second side member 72.

The gear rack 48 may be made from any of a wide range of materials, such as metals or plastics, suitable for the intended application. In the embodiment shown and described herein wherein the first side member 70 of the frame assembly 38 comprises molded plastic, the gear rack 48 comprises an integral component of the first side member 70 (i.e., the gear rack 48 comprises a molded portion of the first side member 70). Alternatively, the gear rack 46 may comprise a separate component fixedly mounted to the first side member 70.

The main body portion 96 of thumb assembly 40 is provided with a pinion gear 50 positioned so that it engages the gear rack 48. See FIGS. 3 and 6(*a–b*). The pinion gear 50 is caused to rotate by a drive system 52 which, in one preferred embodiment includes a motor 98 and a gear reduction system 94. The motor 98 may be mounted to the main body portion 96 of thumb assembly 40 and is operatively associated with the gear reduction system 94 so that the motor 98 rotates the pinion gear 50 to extend and retract the thumb assembly 40.

The motor 98 may comprise any of a wide range of motors suitable for the intended application. In one preferred embodiment, the motor 98 comprises a permanent magnet d.c. motor, such as model no. RS-385PH, available from Mobuchi Corp. of China, although other types may also be used.

The gear reduction system 94 may comprise a conventional gear reduction system utilizing a plurality of spur gears to provide a reduction ratio sufficient to allow the motor 98 to extend and retract the thumb assembly 40 at an appropriate speed and with sufficient force to withdraw and insert the data cartridge 14 into the selected cartridge receiving device. In one preferred embodiment, the gear reduction system 94 provides a reduction ratio of about 11.5:1, although other ratios may be used depending on the speed and torque characteristics of the particular motor 98 that is selected. The various spur gears comprising the gear reduction system 94 may be made from any convenient material, such as metal or plastic, suitable for the intended application. By way of example, in one preferred embodiment, the various spur gears comprising the gear reduction system 94 are made from brass and stainless steel. Alternatively, the gear reduction system could utilize other types of gears, such as worm gears, to provide the desired reduction.

The thumb assembly 40 may also be provided with any of a wide variety of finger assemblies well-known in the art for engaging data cartridges, such as data cartridge 14. Accordingly, the present invention should not be regarded as limited to any particular type of finger assembly. By way of example, in one preferred embodiment, the finger assembly 56 may comprise an arm 57 having a hook portion 59. Hook portion 59 of arm 57 is configured to engage the notch 15 (FIGS. 6(*a–b*)) provided on the data cartridge 14. The arm 57 is pivotally mounted to the main body 96 of the thumb assembly 40 so that the arm 57 is free to pivot about pivot axis 61. A spring 63 biases the arm toward the engaged position shown in FIGS. 3 and 6(*a*). The arm 57 may be provided with a pin 65 which engages the guide track 58 provided on the second side 72 of frame assembly 38. See FIG. 4. The guide track 58 actuates the arm 57 as the thumb assembly 40 moves back and forth between the retracted position shown in FIGS. 3, 4, and 6(*a*) and the extended position shown in FIG. 6(*b*).

However, since finger and track systems, such as finger system 56 and guide track 58, for engaging cartridges are well-known in the art and could be easily provided by persons having ordinary skill in the art after having become familiar with the teachings of the present invention, the particular finger system 56 and guide track 58 used in one preferred embodiment of the present invention will not be described in greater detail herein.

The cartridge engaging assembly 10 may also be provided with an encoder system 62 for providing an output signal from which information may be derived that relates to the position, speed, or acceleration of the thumb assembly. In one embodiment, the encoder system 62 may comprise an elongate linear reference member 64 affixed to the first side member 70 of frame assembly 38, as best seen in FIG. 3. The elongate linear reference member 64 may be provided with a plurality of index marks 66. A detector assembly 68 mounted to the main body portion 96 of thumb assembly 40, detects the index marks 66 on the linear reference member 64 and produces an output signal relating to the presence of absence of an index mark 66. The output signal from the detector assembly 68 may then be used by the picker control system (not shown) to derive information about the position, velocity, or acceleration of the thumb assembly 40.

The elongate reference member 64 may comprise any of a wide range of linear type encoder members that are well-known in the art and readily commercially available. By way of example, in one preferred embodiment, the elongate reference member 64 may comprise a linear encoder member, available from Rhulatec of Germany. The detector assembly 68 may comprise any of a wide range of detectors that are well-known in the art and readily commercially available that would be suitable for detecting the index marks 66 provided on the particular elongate reference member 64 that is to be utilized. In one preferred embodiment, the detector assembly 68 may comprise an optical encoder module, model no. HEDR-8100, available from Hewlett Packard Company of San Jose, Calif., although other devices could also be used.

The data storage system 12 may also be provided with a picker control system (not shown) for coordinating the function and operation of the cartridge engaging assembly 10, as well as the cartridge positioning system 22. However, since such picker control systems are well-known in the art and could be easily provided by persons having ordinary skill in the art after having become familiar with the present invention, the particular picker control system utilized in one preferred embodiment will not be described in further detail herein.

The cartridge engaging assembly 10 may be operated as follows to retrieve and load a data cartridge 14 from and to the selected cartridge receiving device (e.g., either the cartridge storage rack or magazine 14 or the cartridge read/write device 18, as the case may be). Assuming that the cartridge handling system 22 has positioned the cartridge access device 20 adjacent the selected data cartridge 14, the picker control system (not shown) may actuate the drive system 52 to rotate the pinion gear 50 to move the thumb assembly 40 toward the cartridge access end 46 of the frame assembly 38, i.e., in the direction of arrow 54. As the thumb assembly 40 approaches the data cartridge 14, the hook portion 59 of finger assembly 56 engages the notch 15 on the data cartridge 14. See FIG. 6(*b*). After the data cartridge 14 has been engaged by the hook portion 59 of finger assembly 56, the picker control system (not shown) may operate the drive system 52 to reverse the direction of rotation of the pinion gear 50. This causes the thumb assembly 40, along with the engaged cartridge 14, to move in the opposite direction (i.e., in the direction of arrow 55), thereby retracting the thumb assembly 40 and data cartridge 14 into the cavity 44 defined by the frame assembly 38. The drive system 52 continues to retract the thumb assembly 40 and engaged data cartridge 14 until the data cartridge 14 is drawn into the cavity 44 of frame assembly 38 by an amount sufficient to allow the cartridge positioning system 22 to move the cartridge access device 20 to another position. The cartridge positioning system 22 may thereafter move the cartridge access device 20 to a new location.

Once the cartridge access device 20 has been properly positioned adjacent the new location, the picker control system (not shown) may again actuate the drive system 52 to move (i.e., extend) the thumb assembly 40 in the direction of arrow 54. As the thumb assembly 40 extends, the thumb portion 60 pushes against the data cartridge 14, thereby pushing the data cartridge 14 into the selected cartridge receiving device (e.g., the cartridge storage rack or magazine 16 or the cartridge read/write device 18, as the case may be). At the same time, the guide track 58 actuates the finger assembly 56 to disengage the hook portion 59 of finger assembly 56 from the notch 15 provided in the data cartridge 14. Once the thumb assembly 40 is fully extended, the data cartridge 14 will have been inserted fully into the cartridge receiving device. The picker control system (not shown) may then actuate the drive system 52 to retract the thumb assembly 40 back into the cartridge engaging assembly 10. The cartridge access device 20 is then ready to withdraw another data cartridge 14 and transport it to a new location.

It is contemplated that the inventive concepts herein described may be variously otherwise embodied and it is intended that the appended claims be construed to include alternative embodiments of the invention except insofar as limited by the prior art.

What is claimed is:

1. A cartridge engaging assembly comprising:
   a frame assembly having a first side member and a second side member, the first and second side members being positioned in spaced-apart relation;
   a first horizontal guide surface positioned on the first side member of said frame assembly;
   a second horizontal guide surface positioned on the second side member of said frame assembly;
   a thumb assembly having a first bearing member for engaging said first horizontal guide surface, a second bearing member for engaging said second horizontal guide surface and a third bearing member for engaging said second horizontal guide surface, said second and third bearing members being located in spaced-apart relation on said thumb assembly;
   a gear rack positioned on the first side member of said frame;
   a pinion gear mounted for rotation on said thumb assembly so that said pinion gear engages said gear rack, the engagement of said pinion gear and said gear rack defining a first vertical guide surface; and
   wherein the second side member of said frame assembly includes a second vertical guide surface and wherein said thumb assembly includes a fourth bearing member for engaging said second vertical guide surface.

2. The cartridge engaging assembly of claim 1, wherein said second horizontal guide surface comprises a top surface of a horizontal guide rail positioned on the second side member of said frame assembly.

3. The cartridge engaging assembly of claim 2, wherein said thumb assembly includes a first flange member extending from a first side of said thumb assembly and a second flange member extending from a second side of said thumb assembly, said first bearing member of said thumb assembly being positioned on said first flange member of said thumb assembly, said second and third bearing members of said thumb assembly being positioned on said second flange member of said thumb assembly.

4. The cartridge engaging assembly of claim 3, wherein said second flange member comprises a C-shaped member having a bottom facing surface and a top facing surface and wherein said second and third bearing members are located on the bottom facing surface of said C-shaped member, said second and third bearing members on the bottom facing surface of said C-shaped member engaging the top surface of said horizontal guide rail.

5. The cartridge engaging assembly of claim 4, further comprising a horizontal capture rail positioned in spaced-apart relation to said first horizontal guide surface so that said first flange member of said thumb assembly is located substantially between said first horizontal guide surface and said horizontal capture rail.

6. A cartridge engaging assembly, comprising:
   a frame assembly having a first side member and a second side member, the first and second side members of said frame assembly being positioned in spaced-apart relation;
   a first elongate guide rail positioned on the first side member of said frame assembly, said first elongate guide rail including a first horizontal guide surface;
   a second elongate guide rail positioned on the second side member of said frame assembly said second elongate guide rail including a second horizontal guide surface;
   a thumb assembly having a first bearing member for engaging the first horizontal guide surface of said first elongate guide rail, a second bearing member for engaging the second horizontal guide surface of said second elongate guide rail, and a third bearing member for engaging the second horizontal guide surface of said second elongate guide rail, said second and third bearing members being positioned in spaced-apart relation;
   a gear rack positioned on the first side member of said frame;
   a pinion gear mounted for rotation on said thumb assembly so that said pinion gear engages said gear rack, the engagement of said pinion gear and said gear rack defining a first vertical guide surface; and
   wherein the second side member of said frame assembly includes a second vertical guide surface and wherein said thumb assembly includes a fourth bearing member for engaging the second vertical guide surface.

7. The cartridge engaging assembly of claim 6, wherein said first elongate guide rail comprises an integral component of the first side member of said frame assembly and wherein said second elongate guide rail comprises an integral component of the second side member of said frame assembly.

8. The cartridge engaging assembly of claim 7, wherein said thumb assembly includes a first flange member extending from a first side of said thumb assembly and a second flange member extending from a second side of said thumb assembly, said first bearing member of said thumb assembly being positioned on said first flange member and said second and third bearing members of said thumb assembly being positioned in spaced-apart relation on said second flange member.

9. The cartridge engaging assembly of claim 8, wherein said first bearing member comprises an integral component of said first flange member and wherein said second and third bearing members comprise integral components of said second flange member.

10. The cartridge engaging assembly of claim 9, wherein said second flange member comprises a C-shaped member having a bottom facing surface and a top facing surface and wherein said second and third bearing members are located on the bottom facing surface of said C-shaped member, said second and third bearing members on the bottom facing surface of said C-shaped member contacting the second horizontal surface of said second elongate guide rail.

11. The cartridge engaging assembly of claim 10, further comprising a horizontal capture rail positioned in spaced-apart relation to the first horizontal guide surface of said first elongate guide rail so that said first flange member of said thumb assembly is located substantially between the first horizontal guide surface of said first elongate guide rail and said horizontal capture rail.

* * * * *